(12) United States Patent
Gayton

(10) Patent No.: US 6,780,335 B2
(45) Date of Patent: Aug. 24, 2004

(54) LIQUID SEPARATION AND EXTRACTION

(75) Inventor: Paul William Gayton, Aberdeen (GB)

(73) Assignee: Ingen Process Limited, Aberdeen (GB)

( * ) Notice: Subject to any disclaimer, the term of this patent is extended or adjusted under 35 U.S.C. 154(b) by 0 days.

(21) Appl. No.: 10/275,733

(22) PCT Filed: May 10, 2001

(86) PCT No.: PCT/GB01/02037
§ 371 (c)(1),
(2), (4) Date: Mar. 28, 2003

(87) PCT Pub. No.: WO01/86114
PCT Pub. Date: Nov. 15, 2001

(65) Prior Publication Data
US 2003/0155315 A1 Aug. 21, 2003

(30) Foreign Application Priority Data
May 11, 2000 (GB) .............................................. 0011921

(51) Int. Cl.[7] .......................................... B01D 17/035

(52) U.S. Cl. .................... 210/800; 210/747; 210/221.1; 210/513; 166/311; 417/108

(58) Field of Search ................................. 210/800, 801, 210/802, 747, 170, 221.1, 513; 166/311; 417/108

(56) References Cited

U.S. PATENT DOCUMENTS 5,128,052 A    7/1992   Bullock
5,979,559 A   11/1999   Kennedy

*Primary Examiner*—Robert James Popovics
(74) *Attorney, Agent, or Firm*—Nath & Associates PLLC; Gary M. Nath; Lee C. Heiman

(57) ABSTRACT

A process for the separation and extraction of liquid from a multi-component fluid within a conduit in which said liquid tends to settle, said process comprising introduction of a coil tubing into a predetermined settlement region within said conduit, said tubing having an inlet at said settlement region and being operatively connected to aspirating means, whereby the said liquid is separated within the settlement region and aspirated into the tubing and thereby extracted.

4 Claims, 1 Drawing Sheet

LIQUID SEPARATION AND EXTRACTION

Figure 1:
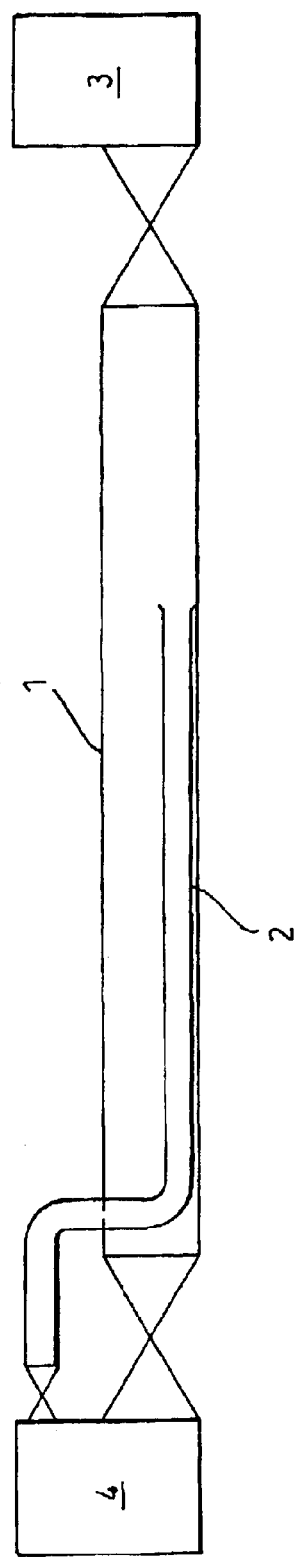

This invention represents a novel process for the separation and extraction of liquids from a conduit such as a flow line and more particularly to a process for extracting separated liquids from a multiphase or wet gas pipeline.

In the extraction of fluids such as hydrocarbons from a well bore, multiphase fluids which may for example include mixtures of liquid and gas phased products are not uncommon. Whilst these products are recovered simultaneously from the well, it is generally desirable to separate the different phases of the fluids for collection in purpose built facilities.

Presently, the liquid phase is either separated by sub-sea or topsides facilities prior to being transported by a pipeline or alternatively, the pipeline is designed to allow transportation of fluids without prior liquid removal. This necessitates the use of complicated sub-sea or topsides separation facilities and/or complicated mechanical pipeline design.

It is an object of the present invention to provide an improved process for the separation and extraction of fluids from conduits which overcomes or at least mitigates the aforementioned disadvantages.

According to one aspect of the present invention there is provided a process for the separation and extraction of liquid from a multi-component fluid within a conduit in which said liquid tends to settle, said process comprising introduction of a coil tubing into a predetermined settlement region within said conduit, said tubing having an inlet at said settlement region and being operatively connected to aspirating means, whereby the said liquid is separated within the settlement region and aspirated into the tubing and thereby extracted.

Advantageously the coil tubing is maintained at a lower pressure than the conduit to encourage flow of liquid into the coil tubing for extraction.

The coil tubing preferably runs along the bottom of the conduit and is substantially smaller in diameter in comparison thereto. In this way the normal flow of fluids through the conduit is not interrupted by the presence of the extraction equipment.

The conduit is preferably a pipeline formed of a plurality of pipe sections joined end to end.

For a conduit with the appropriate produced fluid characteristics, one embodiment may have additional coil tubing strips to provide further liquid removal at other locations in the pipeline.

Better understanding of the invention can be gained by referring to the description hereafter of a non limitative realisation example, with reference to the accompanying drawing wherein:

FIG. 1 shows a schematic drawing of a pipeline according to one aspect of the invention.

FIG. 1 shows a pipeline 1 for the transportation of fluids such as hydrocarbons which is connected between the origination facility 3 which may be provided topside or subsea and a host facility 4. The pipeline is of suitable dimensions such that liquids can flow naturally along the bottom of the pipeline 1 and that it can accommodate coil tubing 2, without restricting the flow of fluids within the pipeline. The coil tubing 2 is run down through the bottom of the pipeline 1 (non concentrically) between the host facility and the low point. The coil tubing 2 is of substantially smaller diameter than the pipeline 1.

In use, in one example, wet gas flows along the pipeline 1 from the origination facilities 3 to the host facility 4. The liquid naturally separates from the wet gas under gravitational forces and settles at the bottom of the pipeline. The free end of the coil tubing is located adjacent the area in which the liquid settles.

The pressure inside the pipeline 1 is a P bar. The pressure inside the coil tubing 2 is kept lower than P bar, at P-x bar. Liquid at the bottom of the pipeline 1, therefore, will be aspirated into the low pressure coil tubing 2 where it will flow to the host facility 4 separate from the gas.

In the application of the process it will be necessary to suitably size the coil tubing pipe and evaluate the difference in pressure required between the coil tubing and the pipeline to optimise the liquid removal. It may also be necessary to evaluate if further separation will be required at the host facility before the fluids removed in the coil tubing can be exported.

The advantages of this novel method to remove liquid within the pipeline include:

cost reduction and technical simplification of pipeline mechanical design;

the reduction of chemical injection usage;

the reduction, or even removal, of additional and more complicated subsea of topsides separation facilities traditionally provided at the source or host locations;

no requirement for receiving facilities liquid slug catching equipment;

stabilised gas and liquid delivery to receiving facilities;

potential to adapt system for use with refrigeration systems to provide conditioning within bundle;

possibility of inserting separation cyclones with coiled tubing to allow some separation within the pipeline; and possibility of inserting coiled tubing downhole to achieve separation of liquids from a multiphase or wet gas well bore flow.

It is to be understood that without departing from the inventive concept, the invention can also be applied to inserting the coiled tubing downhole to achieve separation of liquids from a multiphase or wet gas well bore flow.

What is claimed is:

1. A process for the separation and extraction of liquid from a multi-component fluid within a generally horizontal flow line in which said liquid tends to settle, said process comprising introduction of a coil tubing into a predetermined settlement region within said flow line, said tubing having an inlet at said settlement region and being operatively connected to aspirating means, the coil tubing being maintained at a lower pressure than the flow line to encourage flow of liquid into the coil tubing for extraction whereby the said liquid is separated within the settlement region and aspirated into the tubing and thereby extracted, wherein said coil tubing runs along the bottom of the flow line.

2. A process according to claim 1, wherein the coil tubing is substantially smaller in diameter in comparison to the flow line.

3. A process according to claim 1, wherein the flow line is a pipeline formed of a plurality of pipe sections joined end to end.

4. A process according to claim 1, wherein additional coil tubing strips are inserted into the flow line to provide further liquid removal at other locations in the flow line.

* * * * *